Jan. 28, 1930.  E. L. BAKER  1,744,727
AUTOMOBILE ATTACHMENT
Filed June 1, 1927
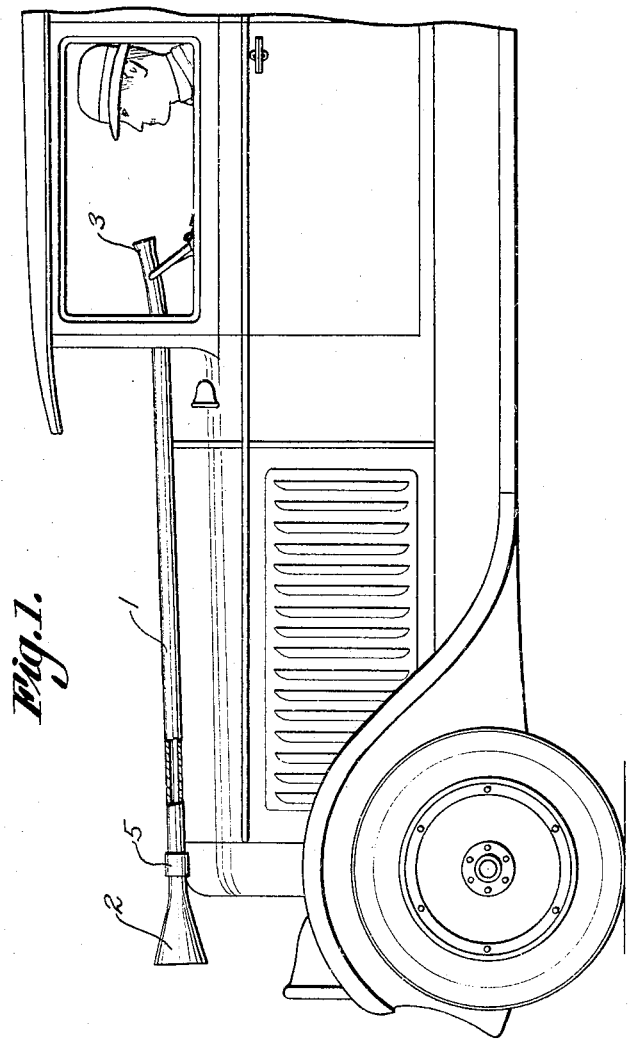
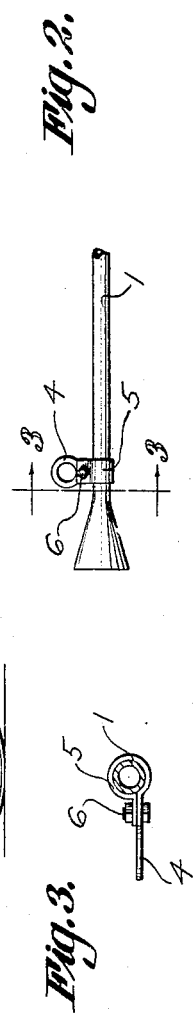
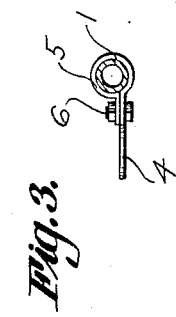
E. L. Baker Inventor
By C. A. Snow & Co.
Attorneys Patented Jan. 28, 1930

1,744,727

UNITED STATES PATENT OFFICE

EUGENE L. BAKER, OF TAUNTON, MASSACHUSETTS

AUTOMOBILE ATTACHMENT

Application filed June 1, 1927. Serial No. 195,772.

This invention relates to an attachment for automobiles and more especially for closed vehicles, one of the objects being to provide a simple and efficient device by means of which the driver of the vehicle can speak to persons in front thereof, thereby to facilitate traffic.

A further object is to provide a device of this character which can be installed readily on a vehicle without requiring any structural changes.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is a side elevation of a portion of a vehicle having the present improvements combined therewith.

Figure 2 is a plan view of a portion of the attachment and showing one means which can be used for holding it in position at its front end.

Figure 3 is a section on line 3—3, Figure 2.

Referring to the figures by characters of reference 1 designates a tube arranged longitudinally of the hood of a vehicle and, in the structure illustrated, resting on the hood. This tube is provided at one end with a small megaphone which can consist of a flared extension 2 of the tube. The other end of the tube is extended into the vehicle to a point close to the driver where it is provided with a mouth-piece 3 into which the driver can easily speak. As before stated any desired means can be employed for attaching the tube to the vehicle at its forward end. For example a ring 4 can be mounted on the filling sleeve or inlet of the radiator, this ring having an integral clamp 5 extending around the tube and secured to the tube by a bolt 6 or the like. If preferred, however, the tube could be arranged under the hood with the megaphone opening through or in front of the radiator. Obviously various other modifications of the structure could be employed but in every case the mouth-piece 3 would be so located that the driver could readily speak thereinto to persons in front of the vehicle so as to facilitate traffic.

What is claimed is:

1. The combination with a vehicle having a closed compartment, of means for transmitting spoken messages from within said closed compartment to a person in front of the vehicle, said means including a mouth piece within the closed compartment located where it can receive sounds from the driver, a forwardly extended sound-amplifying megaphone mounted on the front portion of the vehicle, a ring coupled to the magaphone for engagement with the filling sleeve or inlet of a radiator, and a tubular connection between the megaphone and the mouth piece for conducting sound waves, said connection being supported on the hood of the vehicle.

2. The combination with a vehicle having a closed compartment, of means for transmitting spoken messages from within said closed compartment to a person in front of the vehicle, said means including a mouthpiece within the closed compartment located where it can receive sounds from the occupant of the compartment, a forwardly extended sound amplifying megaphone mounted on the front portion of the vehicle and extending forwardly therefrom, a tubular connection between the megaphone and the mouthpiece for conducting sound waves, and means for holding said connection to the hood of the vehicle.

In testimony that I claim the foregoing as my own, I have hereto affixed my signature.

EUGENE L. BAKER.